United States Patent [19]

Yamamoto et al.

[11] Patent Number: 4,943,010
[45] Date of Patent: Jul. 24, 1990

[54] ACCELERATION SENSOR

[75] Inventors: Toshimasa Yamamoto; Yuji Nishimura, both of Niwa, Japan

[73] Assignee: Kabushiki Kaisha Tokai-Rika-Denki-Seisakusko, Aichi, Japan

[21] Appl. No.: 247,528

[22] Filed: Sep. 22, 1988

[30] Foreign Application Priority Data

Sep. 24, 1987 [JP] Japan ............... 62-145701[U]

[51] Int. Cl.⁵ ............................................. B60R 22/40
[52] U.S. Cl. ................................................ 242/107.4 A
[58] Field of Search ............... 242/107.4 A; 280/803, 280/806, 807; 297/478

[56] References Cited

U.S. PATENT DOCUMENTS 3,780,314 12/1973 Inose et al. .
4,193,565 3/1980 Tamura ..................... 242/107.4 A
4,253,622 3/1981 Nishina ..................... 242/107.4 A
4,619,417 10/1986 Teraoka et al. ............ 242/107.4 A
4,757,954 7/1988 Doty ........................ 242/107.4 A

FOREIGN PATENT DOCUMENTS 33417 9/1984 Japan .

Primary Examiner—Katherine A. Matecki
Attorney, Agent, or Firm—Oliff & Berridge

[57] ABSTRACT

An acceleration sensor for detecting acceleration of at least predetermined magnitude. The sensor has a first lever capable of swinging when acceleration of at least predetermined magnitude occurs, and a second lever capable of swinging to come into contact with the first lever when vertical acceleration of at least predetermined magnitude occurs so as to limit the swinging of the first lever. Therefore, the first lever is prevented from swinging when vertical acceleration of at least predetermined magnitude occurs.

16 Claims, 2 Drawing Sheets

ACCELERATION SENSOR

BACKGROUND OF THE INVENTION

1. Field of the Invention

The present invention relates to an acceleration sensor which may be advantageously used in a webbing retractor that is installed in a vehicle and is adapted to detect any emergency experienced by the vehicle from the acceleration acting in the horizontal direction and to suspend the unwinding of the webbing upon detection.

2. Description of the Related Art

A webbing retractor of the above-described type has an acceleration sensor provided for sensing acceleration of the vehicle in the horizontal direction. An arrangement of such an acceleration sensor is known in which the sensor has a mass body which is movable on an inclined surface, and, when the mass body moves in the horizontal direction to climb the inclined surface, a lever-shaped pawl is actuated by the action of the mass body to suspend the rotation of a lock ring, thereby instantly suspending the unwinding of the webbing from the webbing retractor.

With this arrangement of the acceleration sensor, however, the pawl is also actuated when the mass body moves in the vertical direction. With the above-described acceleration sensor, therefore, when acceleration acts in the vertical direction, the unwinding of the webbing may be suspended even if no emergency is experienced by the vehicle.

Such a phenomenon often takes place when the vehicle is running on a rough surface or if the vehicle is such a vehicle as a motor-truck having a suspension with a large sprig constant. More specifically, the phenomenon occurs when a factor such as bouncing of the vehicle causes the mass body to jump upward from the inclined surface or undergo rolling movement on the inclined surface. In such a case, the vertical acceleration is very much greater than horizontal acceleration of an ordinary magnitude.

SUMMARY OF THE INVENTION

In view of the above-described circumstances, it is an object of the present invention to provide an acceleration sensor which is capable of preventing any unnecessary actuation of a lever even when vertical acceleration of a great magnitude occurs.

According to the present invention, an acceleration sensor comprises a first lever capable of swinging when acceleration of at least a predetermined magnitude occurs, and a second lever capable of swinging when vertical acceleration of at least a predetermined magnitude occurs, so as to limit the swinging of the first lever.

With the above-stated arrangement in accordance with the present invention, when vertical acceleration of at least a predetermined magnitude occurs, the second lever swings to limit the swinging of the first lever.

DESCRIPTION OF THE PREFERRED EMBODIMENT

Figure 1:
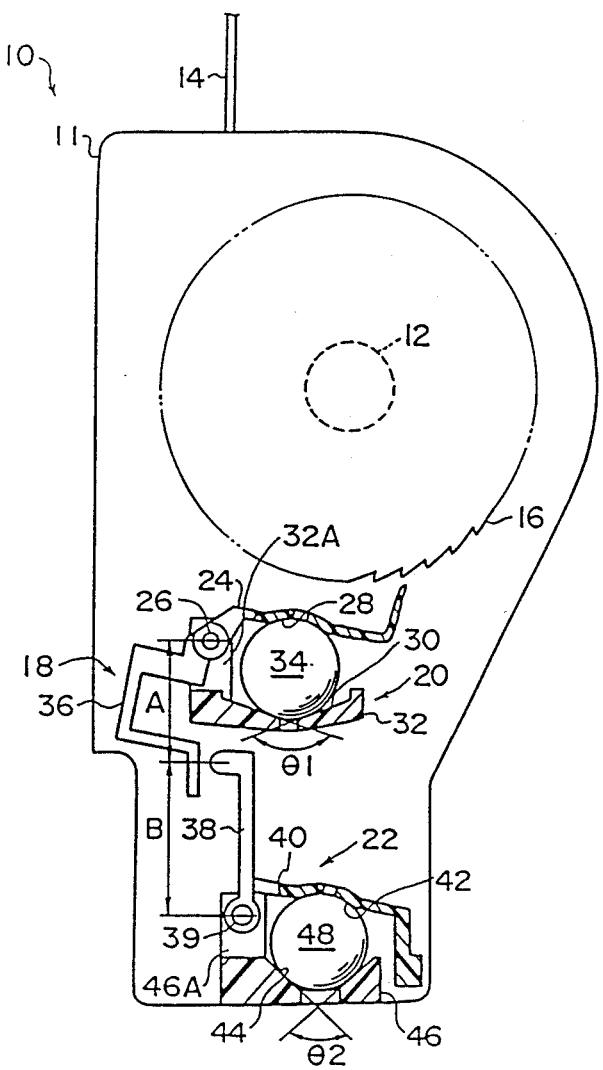
FIG. 1 is a side sectional view showing a first embodiment of an acceleration sensor of the present invention, in which the sensor is used in a webbing retractor of a vehicle.

FIG. 1 illustrates a first embodiment of the present invention, in which an acceleration sensor of the present invention is used in a webbing retractor of a vehicle.

A webbing retractor 10 has a retractor shaft 12 rotatably supported by side walls of a frame 11 with an axis of the shaft 12 extending in a horizontal direction. A webbing 14, which may be fastened around a seat occupant, is retracted onto the retractor shaft 12 by the force of a flat spiral spring (not shown) in a counterclockwise direction as viewed in FIG. 1 (hereafter, the terms "counterclockwise" and "clockwise" will be used to indicate these directions as viewed in FIG. 1). The retractor shaft 12 is linked via a locking mechanism (not shown) to a lock ring 16 disposed coaxially with the shaft 12 on the outside of one side wall of the frame 11. The lock ring 16 has ratchet teeth formed in the outer periphery thereof. When the rotation of the lock ring 16 in the clockwise direction is suspended, the lock mechanism operates to suspend the rotation of the retractor shaft 12 in the direction in which the webbing 14 is unwound. The retractor 10 is provided with an acceleration sensor 18 in accordance with the present invention. The sensor 18 comprises a horizontal acceleration sensing device 20 and a vertical acceleration sensing device 22.

The horizontal acceleration sensing device 20 has a bracket 32 disposed at a position below the lock ring 16 and mounted on a side wall of the frame 11. The bracket 32 has a bifurcated projection 32A (one of the bifurcated parts is not shown in FIG. 1 because it is on this side of the surface of the drawing). The projection 32A pivotally supports a pin portion 26 which is disposed parallel with the retractor shaft 12 and is integral with a pawl 24 serving as a first lever. The pawl 24 is capable of swinging in the counterclockwise direction until its tip engages with one of the ratchet teeth of the lock ring 16, thereby suspending the clockwise rotation of the lock ring 16. The pawl 24 has a conical surface 28 formed in the lower surface of an intermediate portion between the pin portion 26 and the tip of the pawl 24.

A conical surface 30 inclined at a vertically opposite angle of $\theta 1$ is formed in the upper surface of the bracket 32 and is positioned below the conical surface 28. A steel ball 34, serving as a mass body, is disposed upon the conical surface 30. When there is no acceleration, the ball 34 is situated at the centers of the conical surfaces 28 and 30, and is in contact with the conical surface 28 of the pawl 24, thereby preventing the pawl 24 from swinging clockwise under its own weight. The position of the pawl 24 assumed while it is in this state is the limit of the clockwise swinging of the pawl 24, and, with this state of the pawl 24, its tip is not in engagement with the lock ring 16. When the ball 34 climbs the conical surface 30, from the above-described condition, the pawl 24 is pushed by the ball 34 and swings counterclockwise to become engaged with the lock ring 16.

The pawl 24 includes has an arm 36 which is integral therewith and is provided for linking the horizontal acceleration sensing device 20 and the vertical acceleration sensing device 22 together. The arm 36 of the pawl 24 extends from the pin portion 26 away from the tip of the pawl and further extends downward, with its lower end portion positioned below the bracket 32.

The vertical acceleration sensing device 22 has a bracket 46 disposed at a position below the bracket 32 and mounted on a side wall of the frame 11. The bracket 46 has a bifurcated projection 46A (one of the bifurcated parts is not shown in FIG. 1 because it is on this side of the surface of the drawing). The projection 46A pivotally supports a pin portion 39 which is disposed parallel with the retractor shaft 12 and is integral with an arm 38 also serving as a second lever. The arm 38 has a hooked upper end portion the tip of which opposes the lower end portion of the arm 36 of the device 20 in such a manner as to be able to contact therewith. The arm 38 also has an extension 40 which is integral therewith and extends obliquely downward from an intermediate portion of the arm 38. The extension 40 has a conical surface 42 formed in the lower surface of an intermediate portion thereof.

A conical surface 44 inclined at a vertically opposite angle of $\theta_2$ is formed in the upper surface of the bracket 46 and is positioned below the conical surface 42. A steel ball 48, serving as a mass body, is disposed upon the conical surface 44. When there is no acceleration, the ball 48 is situated at the centers of the conical surfaces 42 and 44, and is in contact with the conical surface 42 of the extension 40, thereby preventing the extension 40 from swinging clockwise under its own weight. The position of the extension 40 assumed while it is in this state is the limit of the clockwise swinging of the extension 40, and, with this state of the extension 24, the tip of the upper end portion of the arm 38 is separate from the lower end portion of the arm 36 of the device 20. While the arm 38 is in this state, even when the pawl 24 is swung counterclockwise, the arm 38 does not limit the swinging of the pawl 24. When the ball 48 jumps upward from the conical surface 44, from the above-described condition, the extension 40 swings counterclockwise together with the arm 38, thereby bringing the tip of the upper end portion of the arm 38 into contact with the lower end portion of the arm 36 of the device 20.

The above-mentioned vertically opposite angle $\theta_1$ is set at a value at which, when horizontal acceleration of at least a predetermined magnitude occurs, the ball 34 is capable of climbing the conical surface 30 so as to cause the pawl 24 to swing through an angle large enough to bring the pawl 24 into engagement with one of the ratchet teeth of the lock ring 16.

The above-mentioned vertically opposite angle $\theta_2$ is set at a value which is adequately smaller than the vertically opposite angle $\theta_1$ so that, even when horizontal acceleration of a magnitude far greater than the predetermined magnitude occurs, the ball 48 is kept from climbing the conical surface 44. Thus, the conical surface 44 is made relatively steep.

Further, various dimensions are set in such a manner that, when vertical acceleration of at least a predetermined magnitude occurs, the balls 34 and 48 jump upward so as to cause the pawl 24 and the extension 40, respectively, to swing through equal angles. During this action, however, because the effective arm length A of the arm 36 is set at a length shorter than the effective arm length B of the arm 38, the tip of the upper end portion of the arm 38 travels a distance which is greater than the distance traveled by the portion of the arm 36 where the other arm 38 is in contact therewith, and which is also longer than the distance traveled by the tip of the pawl 24.

The operation of the acceleration sensor 18 will now be described.

When there is not any vertical or horizontal acceleration, both the horizontal and vertical acceleration sensing devices 20 and 22 are in the condition shown in FIG. 1.

When horizontal acceleration of at least a predetermined magnitude occurs, during, for instance, an emergency experienced by the vehicle, the ball 48 of the vertical acceleration sensing device 22 remains motionless, thereby maintaining the device 22 in the condition shown in FIG. 1, but the ball 34 of the horizontal acceleration sensing device 20 climbs the conical surface 30 so as to push the pawl 24 and thereby cause the pawl 24 to swing counterclockwise. By this action, the pawl 24 is brought into engagement with one of the ratchet teeth of the lock ring 16, thereby instantly suspending the unwinding of the webbing 14 from the retractor shaft 12.

When vertical acceleration of at least a predetermined magnitude occurs, due, for instance, to the bouncing of the vehicle, the balls 34 and 48 jump upward from the conical surfaces 30 and 44, respectively. By this action, the pawl 24 and the extension 40 swing counterclockwise. During this action, however, since the tip of the upper end portion of the arm 38 travels a greater distance than the distance traveled by the end of the pawl 24, the arm 38 contacts with and presses against the arm 36 before the end of the pawl 24 engages with one of the ratchet teeth of the lock ring 16, thereby limiting the swinging of the pawl 24. In this way, any unnecessary suspending of the unwinding of the webbing 14 from the retractor shaft 12 is prevented.

Figure 2:
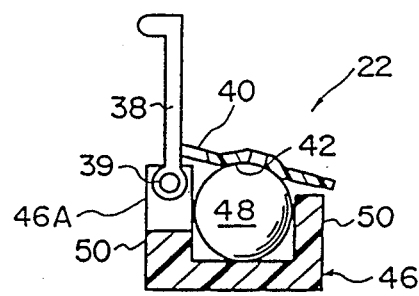
FIG. 2 is a side sectional view showing a second embodiment a bracket of a vertical acceleration sensor.

The conical surface 44 is provided in the bracket 46 of the vertical acceleration sensing device 22 for the purpose of limiting the horizontal movement of the ball 48, and it is not provided to guide the ball 48. Therefore, an arrangement as shown in FIG. 2 may alternatively be adopted, in which, in lieu of the conical surface 44 with a steep inclination, surrounding walls 50 are provided for limiting the horizontal movement of the ball 48.

As described above, the acceleration sensor in accordance with the present invention provides the effect in which any unnecessary actuation of the lever is prevented when vertical acceleration of a large magnitude occurs.

What is claimed is:

1. An acceleration sensor comprising:
   a first inertia body;
   first means for holding the first inertial body so that the first inertia body can move upon being subjected acceleration of at least a predetermined magnitude;
   a first lever means having a first end portion resting on said first inertia body, and a second end portion;
   first means for mounting the first lever means so that the first lever means can be pushed and swung by said first inertia body when said first inertia body is moved;
   a second inertia body;
   second means for holding the second inertia body so that the second inertia body can move upon being subjected to vertical acceleration of at least predetermined magnitude;
   a second lever means having a first end portion resting on said second inertia body, and a second end portion; and second means for mounting the second lever means so that the second lever means can be pushed and swung by said second inertia body when said second inertia body is substantially vertically moved so as to push against said second end portion of said first lever means to limit the swinging of said first lever means.

2. An acceleration sensor according to claim 1, wherein said first inertia body comprises a first ball-shaped body; wherein the means for holding the first inertia body includes means for defining a downwardly projecting conical surface for receiving said first ball-shaped body; and wherein said first lever means includes means for engaging said first ball-shaped body.

3. An accleration sensor according to claim 2, wherein said second inertia body comprises a second ball-shaped body, wherein the means for holding the second inertial body includes means for defining a downwardly projecting conical surface for receiving the second ball-shaped body; and wherein said second lever means includes means for engaging second ball-shaped body.

4. An acceleration sensor according to claim 2, wherein said second inertia body comprises a second ball-shaped body, and wherein the means for holding the second inertia body includes means for retaining the second ball-shaped body in the bottom of a recess, so that movement of said second ball-shaped body is limited in horizontal directions.

5. An acceleration sensor comprising:
first means for sensing acceleration;
a first lever resting on said first means for sensing acceleration;
means for mounting the first lever so that the first lever can swing when the first acceleration sensing means senses a first acceleration of at least a predetermined magnitude;
second means for sensing acceleration;
a second lever resting on the second means for sensing acceleration;
means for mounting the second lever so that the second lever can swing; and,
means for causing the second lever to swing into contact with the first lever, to limit the swinging of the first lever when the second acceleration sensing means senses substantially vertical acceleration of at least a predetermined magnitude.

6. An acceleration sensor according to claim 5, wherein said first acceleration sensing means comprises a first inertia ball; means for supporting the first inertia ball for movement upon an acceleration of at least a predetermined magnitude; and means responsive to movement of the first inertia ball to cause the first lever to swing.

7. An acceleration sensor according to claim 6, wherein said second acceleration sensing means comprises a second inertial ball; means supporting the second inertial ball for movement upon a vertical acceleration of at least a predetermined magnitude; and means responsive to movement of the second inertia ball to cause the second lever to swing.

8. An acceleration sensor according to claim 7, wherein said first lever has a first arm extending therefrom, wherein said second lever has a second arm positioned adjacent to said first arm; and wherein the means responsive to movement of the second inertia ball swings said second arm in a position to limit the swinging of the first lever.

9. An acceleration sensor according to claim 8, wherein said second acceleration sensing means comprises means for limiting horizontal movement of said second inertia ball when said second inertia ball is subjected to horizontal acceleration.

10. An acceleration sensor according to claim 9, wherein said movement limiting means comprises a downwardly projecting conical surface upon which said second inertia ball is disposed.

11. An acceleration sensor according to claim 9, wherein said movement limiting means comprises a recess having has side surfaces between which said second inertial ball is disposed.

12. An acceleration sensor comprising:
a first acceleration sensing means having a first inertia ball;
means for supporting the first ball for movement upon subjection of the first ball to an acceleration of at least a predetermined magnitude;
a first lever;
first means for mounting the first lever for swinging movement;
the first mounting means positioning the first lever for swinging in response to movement of the first ball;
second acceleration sensing means having a second inertial ball;
means for supporting the second ball for movement upon subjection of the second ball to a vertical acceleration of at least a predetermined magnitude;
a second lever;
second means for mounting the second lever for swinging movement; and,
the second mounting means positioning the second lever for swinging in response to the movement of the second ball to a position to limit the swinging of said first lever in response to movement of the first inertia ball.

13. An accleration sensor according to claim 12, wherein said first lever has a first arm extending therefrom, and said second lever has a second arm opposite to said first arm for contacting said first arms to limit the swinging of said first lever.

14. An acceleration sensor according to claim 13, wherein said second acceleration sensing means comprises means for limiting the movement of said second inertia ball in horizontal directions.

15. An acceleration sensor according to claim 14, wherein said movement limiting means comprises has a recess having side surfaces between which said second inertial ball is disposed.

16. An acceleration sensor according to claim 12 wherein the means for supporting the first ball includes a conical surface on which the first ball is received; and means for supporting the second ball includes a conical surface for receiving the ball and the conical surface for the second ball is steeper than the conical surface for the first ball.

* * * * *